Jan. 14, 1930.  R. K. LEE  1,743,612
MOTOR MOUNTING
Filed April 4, 1928
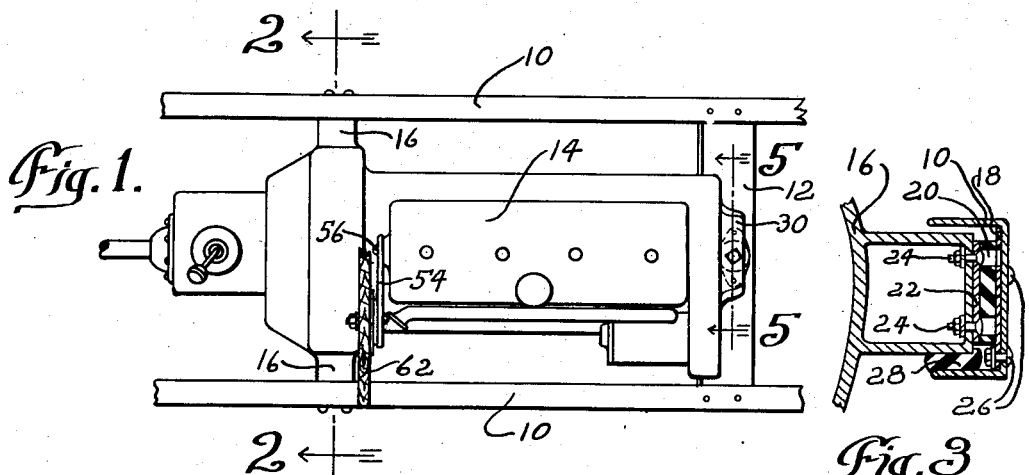
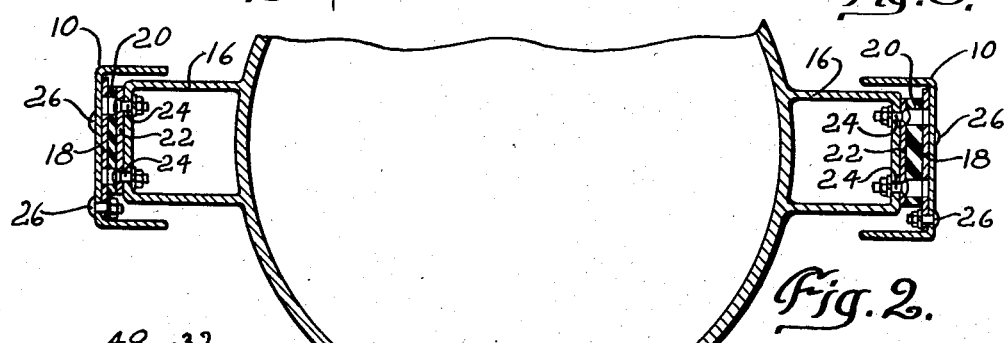
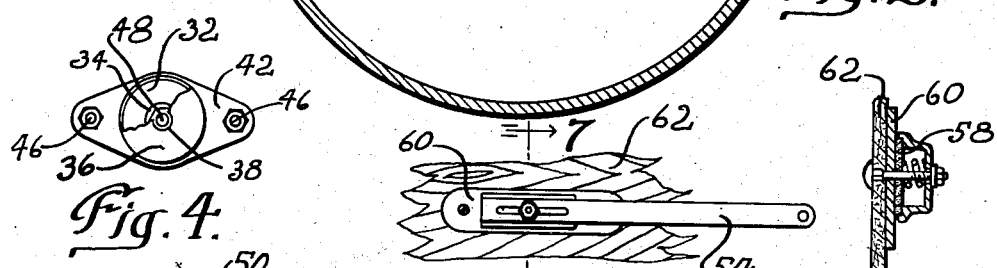
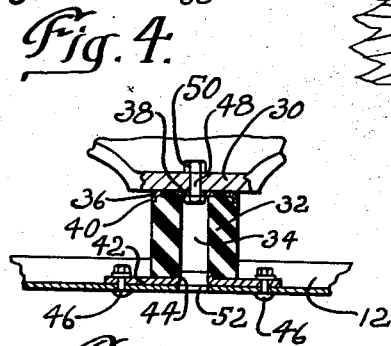
INVENTOR
ROGER K. LEE.
BY
ATTORNEY Patented Jan. 14, 1930

1,743,612

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

MOTOR MOUNTING

Application filed April 4, 1928. Serial No. 267,367.

This invention relates to an engine mounting and more particularly to a resilient mounting adapted to support an engine in an automobile frame.

An important object of the invention is to provide a mounting with a deflection rate such that a minimum force is transmitted from the engine to the automobile frame.

Resilient supports, when under compression, have a low rate of vibration and engine vibration is transmitted through the support to the frame or automobile body. It has been found that by providing resilient supports which are under tension the vibration rate is raised above the vibration rate of the engine and the engine vibrations do not synchronize with the natural frequency of the support. It is therefore another object of the invention to provide resilient supports which are under tension.

A further object of the invention is to provide a plurality of supports for an engine each having a different rate of vibration, particularly a pair of opposite supports, so that the vibration rate of one support does not synchronize with another support.

Other objects and advantages relating to the combination of elastic supports and vibration dampening means will be more fully apparent from the following description taken in connection with the accompanying drawings, in which:

Fig. 1 is a plan view of an internal combustion engine mounted at three points on a portion of an automobile frame; a portion of the automobile dash being shown in section.

Fig. 2 is a sectional view taken on line 2—2 of Fig. 1.

Fig. 3 is a sectional view of one of the lateral supports showing a slightly modified form.

Fig. 4 is a plan view of the engine front end support, parts being broken away.

Fig. 5 is a vertical sectional view of the support shown in Fig. 4.

Fig. 6 is a side elevation of a friction resisting means which may be used in my invention, a portion of the automobile dash carried by the frame being shown in elevation.

Fig. 7 is a sectional view taken on line 7—7 of Fig. 6.

In carrying out my invention, I have shown side frame members 10 of an automobile frame having a cross frame member 12. An internal combustion engine 14 is supported on the frame, preferably at three points, having a central support at the forward end of the engine secured to the cross member 12 and laterally opposite supports adjacent the rear end of the engine secured to the side frame members 10.

The vibration forces of the engine are transmitted to the automobile through the supports and frame when rigid connections are used and while metallic resilient connections under compression eleminate some of the vibration forces of the engine they are not satisfactory for all purposes.

I have provided resilient supports, preferably formed of rubber, which are under tension. As shown on the drawings, wherein the preferred embodiment of my invention has been illustrated, the rear end of the engine is provided with laterally projecting arms 16. The supporting member comprises an outer plate 18 bonded to the outer surface of an elastic member 20 and an inner plate 22 bonded to the inner surface of the elastic member 20. The inner plate 22 is secured to the arms 16 as by bolts 24, the heads of which extend through the inner plate 22. The outer plate 18 may be bolted or riveted or otherwise secured to the side frame member 10; bolts 26 being shown.

The support at one side of the engine is formed of a thickness having a predetermined vibration rate and the support at the opposite side of the engine is formed having a greater thickness and a vibration rate different than the vibration rate of the first mentioned support. By such a construction the vibrations of the one support will not synchronize with the vibrations of the other support and one will dampen out the vibrations of the other.

It will be understood that the elastic material 20 is under tension, supporting its load at a different frequency rate than that of a compressed support.

If desired an additional support such as a rubber block 28 may be interposed between the lower surface of the arm 16 and the lower flange of the side frame member 10 as shown in Fig. 3. This, however, is only necessary when extremely heavy loads are supported.

At the forward end of the engine I have shown a flange 30 extending forwardly over the cross member 12 and a resilient support between the two members. This support, in the form illustrated, is under compression but the parts may be arranged similar to the lateral mountings to support the engine at this point under tension. The support shown comprises a cylindrical block of rubber 32 having an axial opening 34. The upper end of the block 32 is bonded to a plate 36 having an opening 38 smaller in diameter than the diameter of the opening 34. A flange 40 has been provided to extend around the outer periphery of the upper end of the block 32 to make a better bonded connection thereto. The lower end of the block 32 is bonded to a plate 42 having a flange 44 extending into the opening 34 and bonded to the inner periphery of the opening 34.

The plate 42 is adapted to be secured to the cross member 12 by bolts 46 and the plate 36 is secured to the engine flange 30 by a bolt 48 which may be screwthreaded to the flange or held therein by a nut 50. The bolt 48 is inserted through an opening 52 in the cross-member 12, the openings formed by the flange 44 and the opening 34 in the block 32; the head of the bolt engaging the lower surface of the plate 36. The engine is supported against downward movement by compression of the rubber block and supported against upward movement by tension of the rubber block.

It has been found that some vibration dampening means between the engine and the frame is desirable to eliminate the vibration and impulses of the engine from causing synchronous vibration between the engine and the frame or body. A device for accomplishing this is shown and comprises a rod 54 which has one end secured to the engine as at 56 and its opposite end provided with a friction member 58, resiliently urged against a plate 60 mounted on the dash 62 or other member rigidly supported on the framemembers 10. It will be understood that movement of the friction member, caused by the vibration of the engine will tend to dampen those vibrations.

The lateral resilient supports under tension in combination with the vibration dampening means and the resilient front end support cooperate to eliminate transfer of practically all of the engine vibration from engine to frame. It will be understood that the friction device may be attached at one end to the engine and at the other end to any one of a number of parts of the vehicle and in my claims I shall generally consider the vehicle attachment end as any portion of the vehicle or engine supporting means.

While I have described what I deem to be a preferred embodiment of my invention it will be understood that various changes including the size and arrangement of parts may be made without departing from the spirit of my invention. Various combinations of the elements forming my invention may be made and it is not my intention to limit its scope other than by the terms of the appended claims.

What I claim is:

1. In combination, a vehicle, an internal combustion engine for the vehicle having laterally projecting arms at one end thereof, a support for said engine including the vehicle side frame members and a transverse member, resilient means between the opposite ends of said engine and the transverse member, resilient means under tension between the arms of said engine and the side frame members, and frictional resisting means between said engine and said vehicle.

2. In combination, an internal combustion engine having laterally projecting arms, a support for said engine, a resilient member having a given deflection rate between one arm of the engine and its support, and a resilient member having a different deflection rate between the other arm of the engine and its support.

3. In combination, an internal combustion engine having laterally projecting arms, a support for said engine, a resilient member having a given deflection rate between one arm of the engine and its support, a resilient member having a different deflection rate between the other arm of the engine and its support, and frictional resisting means between said engine and said support.

4. In combination, an internal combustion engine, a support at the opposite sides of said engine, an elastic member under tension having a given deflection rate between one side of the engine and its support, and an elastic member under tension having a different deflection rate between the opposite side of said engine and its support.

5. In combination, an internal combustion engine, a support at the opposite sides of said engine, an elastic member under tension having a given deflection rate between one side of the engine and its support, an elastic member under tension having a different deflection rate between the opposite side of said engine and its support and frictional resisting means between said engine and said support.

6. A mounting of the class described comprising, a member to be supported, supports at the opposite sides of the member to be supported horizontally spaced therefrom, an elastic member under tension having a given deflection rate between one side of the member to be supported and its adjacent support, and an elastic member under tension having a different deflection rate between the opposite side of the member to be supported and its adjacent support, said elastic members having their opposite faces secured to the support and the member to be supported.

7. A mounting of the class described comprising, an internal combustion engine having lateral projections, supporting means at the opposite sides of the projections on said engine, a rubber member of a given deflection rate having its horizontally opposite faces secured to one of the projections and its adjacent supporting means respectively, and a rubber member of a different deflection rate having its horizontally opposite face secured to the other projection and its adjacent supporting means respectively.

8. A mounting of the class described comprising, an internal combustion engine having a lateral projections, supporting means at the opposite sides of the projections on said engine, a rubber member of a given deflection rate having its horizontally opposite faces secured to one of the projections and its adjacent supporting means respectively, a rubber member of a different deflection rate having its horizontally opposite faces secured to the other projections and its adjacent supporting means respectively, and frictional resisting means between said engine and said supporting means.

9. A mounting of the class described comprising, in combination, an internal combustion engine having lateral projections at one end thereof, supporting means adjacent the lateral projections on said engine and the opposite end of said engine, an elastic member between the last mentioned end of said engine, an elastic member between the last mentioned end of said engine and its adjacent support, an elastic member under tension having a given deflection rate between one of said projections and its adjacent support, and an elastic member under tension having a different deflection rate between the other of said projections and its adjacent support.

10. A mounting of the class described comprising, in combination, an internal combustion engine having lateral projections at one end thereof, supporting means adjacent the lateral projections on said engine and the opposite end of said engine, an elastic member between the last mentioned end of said engine and its adjacent support, an elastic member under tension having a given deflection rate between one of said projections and its adjacent support, an elastic member under tension having a different deflection rate between the other of said projections and its adjacent support, and frictional resisting means between said engine and said supporting means.

11. A mounting of the class described comprising an internal combustion engine, an automobile frame, and rubber connections forming the only supporting connection between said frame and said engine, at least one of connections being under tension.

12. A front engine support of the class described comprising, a cylindrical block of elastic material having an axial opening therethru, a metallic member having an axial opening smaller than the opening in said cylindrical block bonded to the outer surface of said block at one end thereof, and a metallic member having an axial opening approximately equal to the size of the opening in said cylindrical block bonded to the outer surface of said block at its opposite end.

13. A front engine support of the class described comprising, a block of elastic material, a metallic plate bonded to the opposite surface of said block, means for securing the metallic plate on one side of the block to an engine, and means for securing the metallic plate on the opposite side of the block to a support for the engine.

14. An engine mounting of the class described comprising, a resilient front engine support, and a pair of lateral resilient supports adjacent the rear of said engine, each of said supports having a different deflection rate.

15. A mounting of the class described comprising, an internal combustion engine having lateral projections, supporting means adjacent the projections on said engine, a non-metallic member of a given thickness secured to one of the projections and its adjacent supporting means, and a non-metallic member having a greater thickness secured to the other projection and its adjacent supporting means.

16. A mounting of the class described comprising, an internal combustion engine having lateral projections, supporting means adjacent the projections on said engine, a rubber member of a given thickness having its horizontally opposite faces secured to one of the projections and its adjacent supporting means respectively, and a rubber member of a greater thickness having its horizontally opposite faces secured to the other projection and its adjacent supporting means respectively.

17. An engine mounting of the class described comprising, a block of rubber forming a resilient front engine support, and a block of rubber at the opposite sides of said engine forming the rear engine support, each of said rubber blocks having a different thickness.

ROGER K. LEE.